(12) United States Patent
Lin et al.

(10) Patent No.: US 8,940,061 B2
(45) Date of Patent: Jan. 27, 2015

(54) APPARATUS FOR GENERATING HYDROGEN

(75) Inventors: Yu-Hsiang Lin, Hsinchu County (TW); Po-Kuei Chou, Hsinchu County (TW); Men-Chi Hsieh, Hsinchu County (TW)

(73) Assignee: Young Green Energy Co., Hsinchu County (TW)

( * ) Notice: Subject to any disclaimer, the term of this patent is extended or adjusted under 35 U.S.C. 154(b) by 751 days.

(21) Appl. No.: 13/244,614

(22) Filed: Sep. 25, 2011

(65) Prior Publication Data

US 2012/0156103 A1 Jun. 21, 2012

(30) Foreign Application Priority Data

Dec. 16, 2010 (CN) .......................... 2010 1 0597493

(51) Int. Cl.
*B01J 7/00* (2006.01)
*C01B 3/24* (2006.01)
*C01B 3/26* (2006.01)
*C01B 3/06* (2006.01)

(52) U.S. Cl.
CPC ............... *C01B 3/065* (2013.01); *Y02E 60/362* (2013.01)
USPC .......... 48/61; 48/127.9; 48/127.1; 423/648.1; 423/650; 423/651; 423/652; 423/657; 422/129

(58) Field of Classification Search
USPC ........ 48/127.9, 127.1, 61; 423/657, 650–652, 423/648.1; 422/129
See application file for complete search history.

(56) References Cited

U.S. PATENT DOCUMENTS

| 5,043,234 | A | * | 8/1991 | Tomantschger et al. ........ 429/59 |
| 5,242,565 | A | * | 9/1993 | Winsel .......................... 204/265 |
| 5,997,821 | A | * | 12/1999 | Joshi ............................. 422/129 |
| 6,645,651 | B2 | | 11/2003 | Hockaday et al. |
| 7,344,571 | B2 | * | 3/2008 | Bae et al. .......................... 48/61 |
| 7,481,858 | B2 | * | 1/2009 | Rosenzweig et al. ............. 48/76 |
| 7,674,540 | B2 | * | 3/2010 | Adams et al. ................. 429/410 |

(Continued)

FOREIGN PATENT DOCUMENTS

| CN | 101495602 | 7/2009 |
| JP | 2006147194 | 6/2006 |

(Continued)

OTHER PUBLICATIONS

"First Office Action of China Counterpart Application", with English translation thereof, issued on Jan. 29, 2013, p. 1-p. 12.

*Primary Examiner* — Kaity Handal
(74) *Attorney, Agent, or Firm* — Jianq Chyun IP Office

(57) ABSTRACT

An apparatus for generating hydrogen for fuel cells is provided. The apparatus includes a housing, a button, a first separating plate, a solid state reactant, and a separating membrane. The housing has an opening and a reservoir. The button connected to the housing covers the opening. The first separating plate disposed in the housing divides the reservoir into first and second sub-rooms. The opening communicates with the first sub-room and the first sub-room is suitable for storing a liquid reactant. The first separating plate has a through hole opposite to the button. The solid state reactant is disposed in the second sub-room. The separating membrane disposed on the through hole separates the first sub-room from the second sub-room. When the button is pushed, the button damages the separating membrane. Therefore, the liquid reactant flows to the second sub-room and reacts with the solid state reactant to generate hydrogen.

12 Claims, 6 Drawing Sheets

(56) References Cited

U.S. PATENT DOCUMENTS

| | | | | |
|---|---|---|---|---|
| 7,727,293 | B2* | 6/2010 | Rosenzweig et al. | 48/61 |
| 8,118,893 | B2* | 2/2012 | Rosenzweig et al. | 48/76 |
| 8,338,045 | B2* | 12/2012 | Sarata et al. | 429/444 |
| 8,506,659 | B2* | 8/2013 | Ord et al. | 48/61 |
| 8,636,961 | B2* | 1/2014 | Sgroi et al. | 422/236 |
| 2004/0148857 | A1* | 8/2004 | Strizki et al. | 48/127.9 |
| 2004/0202903 | A1* | 10/2004 | deVos et al. | 429/19 |
| 2004/0243184 | A1 | 12/2004 | Johnson et al. | |
| 2009/0029209 | A1 | 1/2009 | Wang et al. | |
| 2009/0123342 | A1* | 5/2009 | Sgroi et al. | 422/107 |
| 2010/0104481 | A1* | 4/2010 | Curello et al. | 422/112 |
| 2012/0141335 | A1* | 6/2012 | Lin et al. | 422/236 |

FOREIGN PATENT DOCUMENTS

| | | |
|---|---|---|
| TW | 200640070 | 11/2006 |
| WO | 0174710 | 10/2001 |
| WO | 2010035250 | 4/2010 |

* cited by examiner

APPARATUS FOR GENERATING HYDROGEN

CROSS-REFERENCE TO RELATED APPLICATION

This application claims the priority benefit of China application Ser. No. 201010597493.3, filed on Dec. 16, 2010. The entirety of the above-mentioned patent application is hereby incorporated by reference herein and made a part of this specification.

BACKGROUND OF THE INVENTION

1. Field of Invention

The invention relates to an apparatus for generating hydrogen. More particularly, the invention relates to an apparatus for generating hydrogen with a solid state reactant.

2. Description of Related Art

Fuel cells (FCs) are power packages capable of directly transforming chemical energy into electric energy. Comparing with the traditional method for generating electric power, fuel cells have the advantages of low pollutions, low noise, high energy density and high energy conversion efficiency. Therefore, the prospect of fuel cells as the non polluting source of energy is brightening. Furthermore, the fuel cells are applicable in various fields, such as a portable electronic products, a home power generation system, transportation, military equipment, space industry, a small-size power generation system, and so forth.

Specifically, various FCs could be applied to different fields based on different operational conditions. When the FC is used as a mobile energy source, the FC mainly refers to a hydrogen proton exchange membrane fuel cell (PEMFC) and a direct methanol fuel cell (DMFC). Both of them are operated at low temperature with use of the proton exchange membrane to perform proton conduction mechanism. Under the operation principle of the proton exchange membrane cell, such as the oxidation reaction of the hydrogen at an anode catalyst layer to generate hydrogen ions (H+) and electrons (e−) (PEMFC) or the oxidation reaction of the methanol and water at the anode catalyst layer to generate hydrogen ions (H+), carbon dioxide ($CO_2$) and electrons (e−) (DMFC), the hydrogen ions could be conducted to the cathode through the proton exchange membrane while the electrons could be transported to the cathode after the electrons flowing through an external circuit are applied to a load to work. The reduction reaction between the oxygen supplied to the cathode and the hydrogen ions and the electrons occurs at a cathode catalyst layer, and thereby water is produced. The aforementioned hydrogen for the anode could be obtained from the solid state sodium borohydride (NaBH4) hydrogen storage technique in which the water is introduced into the solid state sodium borohydride to generate hydrogen.

For instance, the solid state sodium borohydride and water bag could be placed in a housing and the housing is equipped with a string object therein for piercing the water bag. The user could push the button on the housing for piercing the water bag so that the water in the water bag flows out of the water bag and reacts with the solid state sodium borohydride to generate hydrogen. When the leak of the water bag is not big enough, only a small portion of water flows from the water bag and most of water remains in the water bag. Therefore, the solid state sodium borohydride could not react with the adequate amount of water and the generation efficiency of hydrogen is low.

Taiwan Patent No. TW200640070 and the United State Publication No. US20090029209 and No. US20040243184 disclose the related arts of fuel cells.

SUMMARY OF THE INVENTION

Accordingly, the invention provides an apparatus for generating hydrogen capable of increasing hydrogen generation efficiency.

The other objects and advantages of the invention can be further comprehended by the technical features disclosed by the invention.

To achieve these and other advantages and in accordance with the purpose of the invention, as embodied and broadly described herein, the invention provides an apparatus for generating hydrogen for fuel cells. The apparatus for generating hydrogen includes a housing, a button, a first separating plate, a solid state reactant, and a separating membrane. The housing has an opening and a reservoir. The button is connected to the housing and covers the opening. The first separating plate is disposed in the housing to divide the reservoir into a first sub-room and a second sub-room. The opening communicates with the first sub-room and the first sub-room is suitable for storing a liquid reactant. The first separating plate has a through hole which is opposite to the button. The solid state reactant is disposed in the second sub-room. The separating membrane is disposed on the through hole so that the first sub-room is separated from the second sub-room. When the button is pushed, the button damages the separating membrane. Therefore, the liquid reactant flows to the second sub-room through the through hole due to gravity and the liquid reactant reacts with the solid state reactant to generate hydrogen.

Accordingly, in the embodiment of the invention, the liquid reactant and the solid state reactant are disposed in different sub-rooms of the housing. When the button is pushed to damage the separating membrane for separating the sub-rooms from each other, the liquid reactant flows towards the solid state reactant due to gravity. Since the liquid reactant is not blocked by any object (such as water bag) while it flows through the through hole, the proportion of liquid reactant reacting with the solid state reactant increases and the efficiency of hydrogen generation increases as well.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
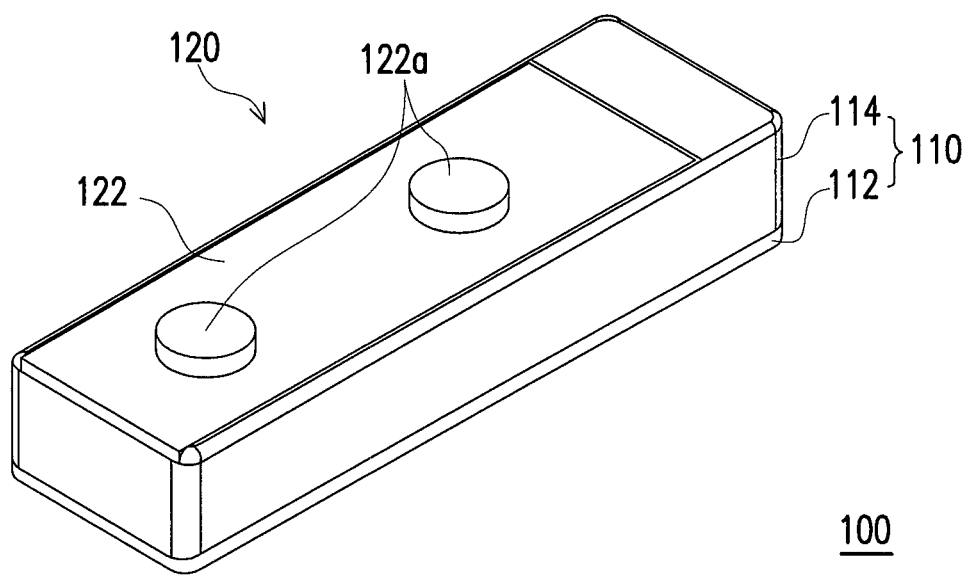
FIG. 1 is a three-dimensional diagram showing an apparatus for generating hydrogen according to one embodiment of the invention.
Figure 2:
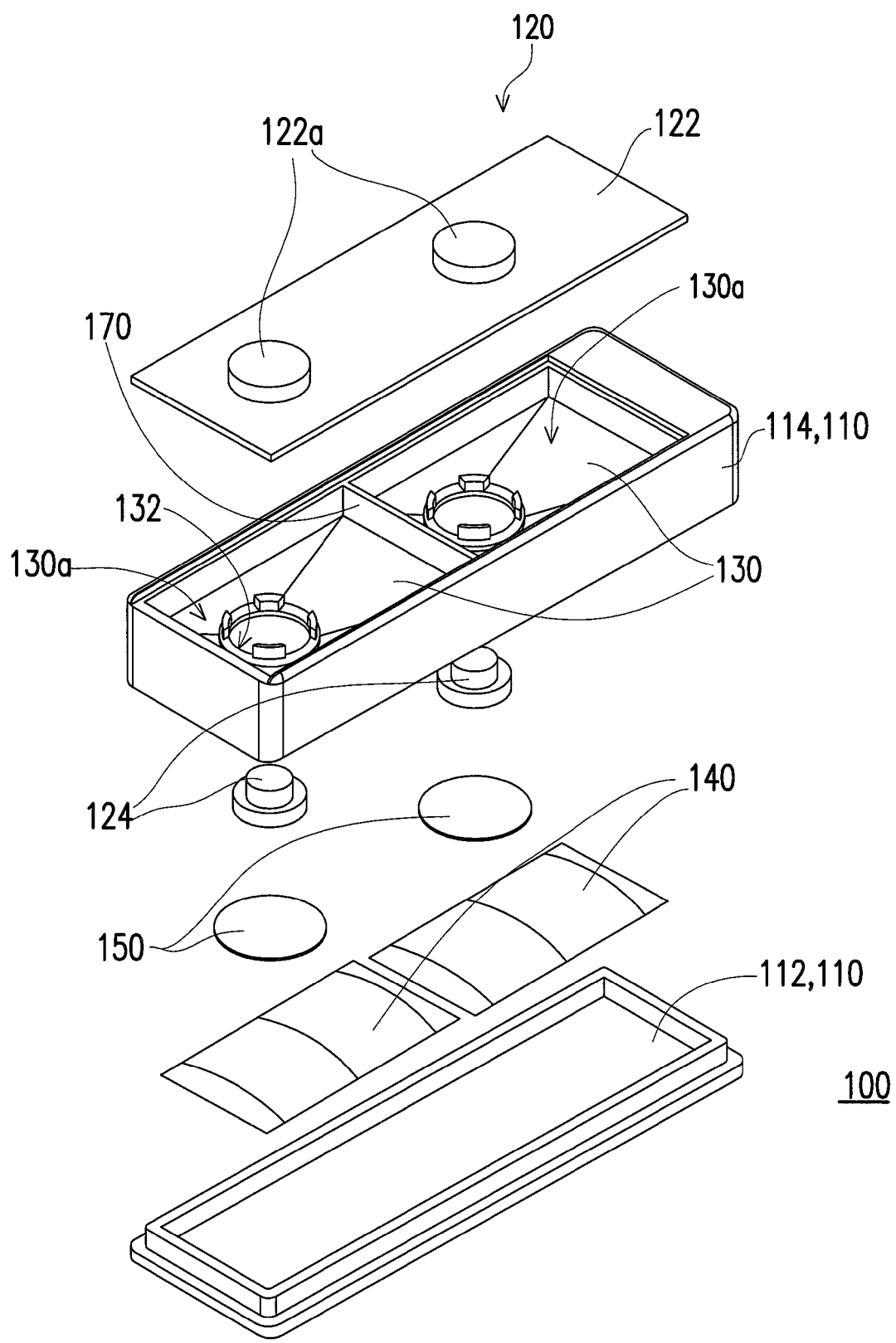
FIG. 2 is an exploded diagram of the apparatus for generating hydrogen of FIG. 1.
Figure 3:
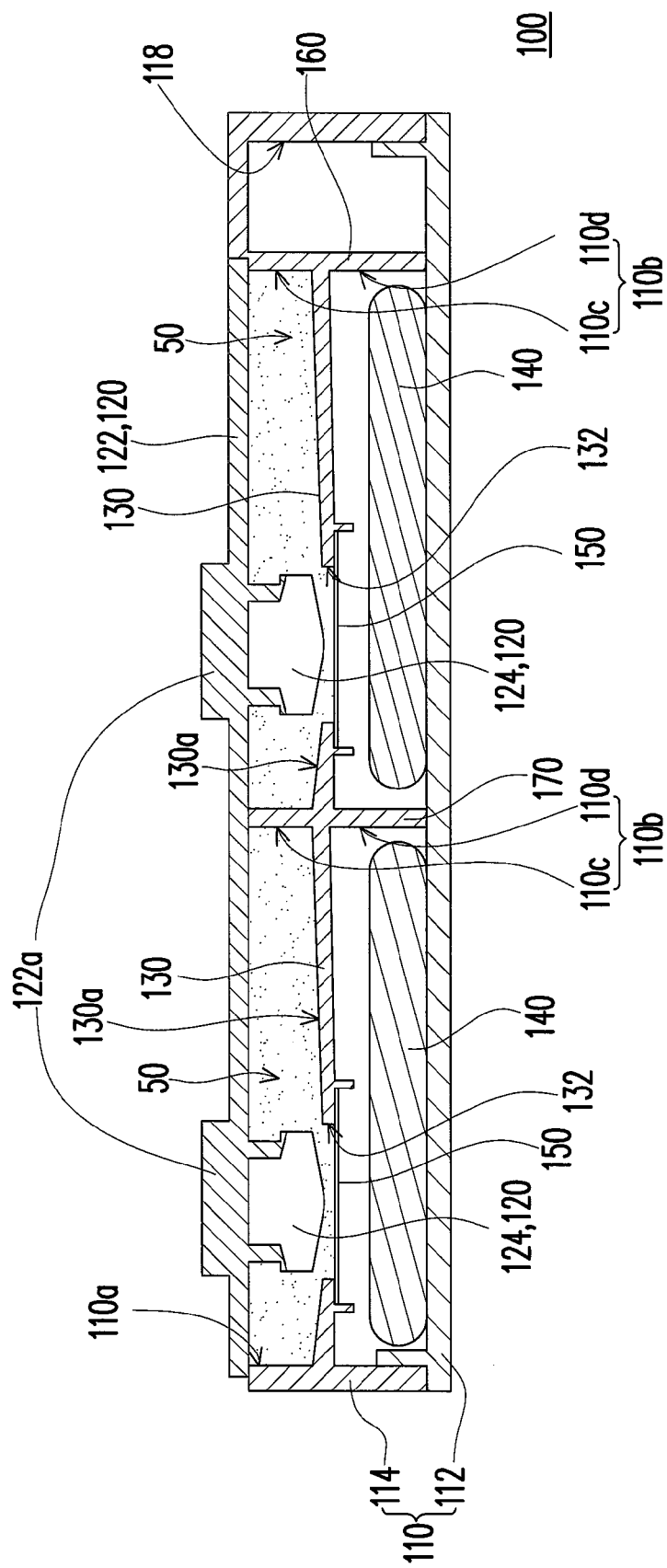
FIG. 3 is a cross-sectional view of the apparatus for generating hydrogen of FIG. 1.

FIG. 1 is a three-dimensional diagram showing an apparatus for generating hydrogen according to one embodiment of the invention. FIG. 2 is an exploded diagram of the apparatus for generating hydrogen of FIG. 1. FIG. 3 is a cross-sectional view of the apparatus for generating hydrogen in FIG. 1. As shown in FIG. 1 to FIG. 3, an apparatus 100 for generating hydrogen of this embodiment could be suitable for, for example, fuel cells and provide hydrogen for fuel cell to generate electric power. The apparatus 100 for generating hydrogen includes a housing 110, a button 120, a first separating plate 130, a solid state reactant 140, and a separating membrane 150.

The housing 110 has an opening 110a and a reservoir 110b. The button 120 is connected to the housing 110 and covers the opening 110a. The first separating plate 130 is disposed in the housing 110 for dividing the reservoir 110b into a first sub-room 110c and a second sub-room 110d. The opening 110a communicates with the first sub-room 110c and the first sub-room 110c is suitable for storing a liquid reactant 50. The first separating plate 130 has a through hole 132 opposite to the button 120. The solid state reactant 140 is disposed in the second sub-room 110d. The separating membrane 150 is disposed on the through hole 132 for separating the first sub-room 110c from the second sub-room 110d. When the button 120 is pushed, the button 120 damages the separating membrane 150 so that the liquid reactant 50 flows to the second sub-room 110d through the through hole 132 due to gravity and the liquid reactant 50 reacts with the solid state reactant 140 to generate hydrogen.

Under the aforementioned arrangement, after the button 120 is pushed to damage the separating membrane 150, the liquid reactant 50 flows to the solid state reactant 140 due to gravity. Since the liquid reactant 50 is directly disposed in the first sub-room 110c and are not contained in any other object, nothing blocks the liquid reactant from flowing to the second sub-room 110d. Therefore, a relatively large portion of the liquid reactant 50 is able to flow to the second sub-room 110d through the through hole 132 so as to react with the solid state reactant 140 in the second sub-room 110d. Hence, the generation efficiency of hydrogen increases. The solid state reactant 140 of the embodiment could be, for example, solid state sodium borohydride, and the liquid reactant 50 could be, for example, water. However, the invention is not limited by the aforementioned exemplars. In the other embodiments, the solid state reactant and the liquid reactant could be other substances which react with each other to generate hydrogen. For instance, the solid state reactant could be, for example, Magnesium Hydride or Aluminum and the liquid reactant could be, for example, Malic Acid, Citric Acid, Sulfuric Acid ($H_2SO_4$), Baking Soda ($NaHCO_3$) solution or Calcium Carbonate ($CaCO_3$) solution.

The button 120 of the embodiment is connected to the housing, for example, in a thermal compression process so that the whole structure of the apparatus is airtight and the generation efficiency of hydrogen increases. Moreover, the button 120 of the embodiment includes a plate body 122, a pushing piece 122a and a piercing element 124. The plate body 122 is made of, for example, plastic material and is connected to the housing 110 and covers the opening 110a. The pushing piece 122a is connected to the plate body 122 and the piercing element 124 fixes on the pushing piece 122a and faces the separating membrane 150. The user could push the pushing piece 122a so that the separating membrane 150 is damaged by the piercing element 124. The pushing piece 122a could be made of, for example, rubber with elasticity so that it is beneficial for the user to push the pushing piece 122a. The pushing key 122a is connected to the plate body 122 by, for example, in a double injection molding process or an adhering process.

As shown in FIG. 2 and FIG. 3, more specifically, the first separating plate 130 has a sloping surface 130a and the through hole 132 is disposed on a lower part of the sloping surface 130a, which ensures that the liquid reactant 50 converges on the through hole 132 due to gravity and flows towards the solid state reactant 140 through the through hole 132. Accordingly, it is easy for the liquid reactant 50 rapidly flowing towards the second sub-room 110d where the solid state reactant 140 is located.

Furthermore, the housing 110 of the embodiment includes a bottom plate 112 and a cover 114. The cover 114 is connected to the bottom plate 112 so that the cover 114 and the bottom plate 112 together define the reservoir 110b. The opening 110a is formed in the cover 114 and the first separating plate 130 is connected to an inner wall of the cover 114.

In the embodiment, the cover 114 is connected to the bottom plate 112 by, for example, a hot-melt process or an adhering process.

Figure 4:
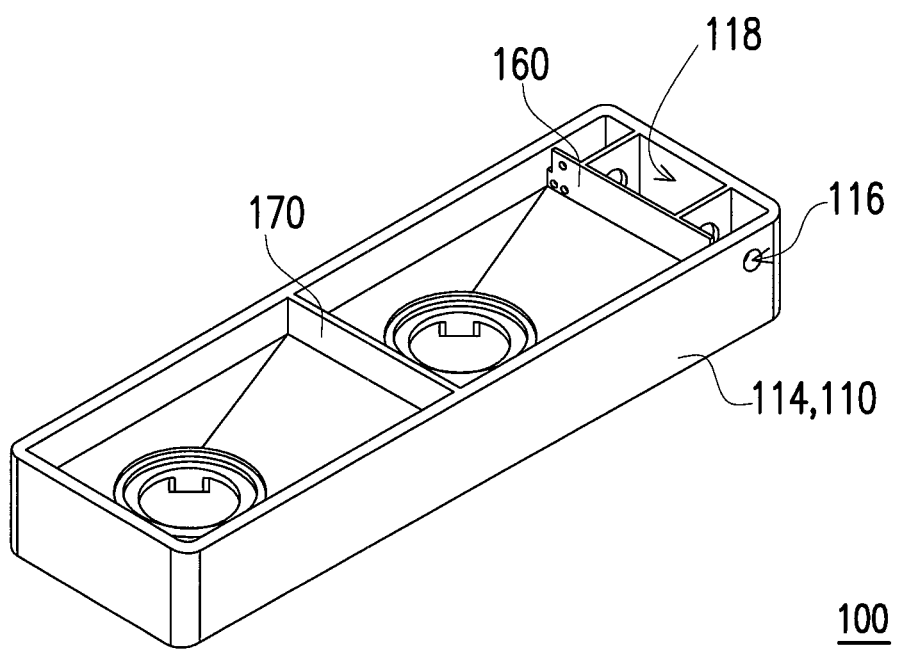
FIG. 4 is a three-dimensional diagram of a cover shown in FIG. 2 from another viewing angle.

FIG. 4 is a three-dimensional diagram of a cover shown of FIG. 2 from another viewing angle. As shown in FIG. 4, the housing 110 of the embodiment has a vent 116 for communicating with the reservoir 110b (shown in FIG. 3). Hence, hydrogen generated in the reaction between the solid state reactant 140 and the liquid reactant 50 could be expelled by the vent 116 and could be used by the fuel cell. Moreover, as shown in FIG. 3 and FIG. 4, the apparatus 100 for generating hydrogen further includes a second separating plate 160 disposed in the housing 110 for defining a flow path 118. The flow path 118 communicates the reservoir 110b with the vent 116. The user could place a drying agent in the flow path 118 for absorbing water vapor in company with the hydrogen generated by the reaction between the solid state reactant 140 and the liquid reactant 50. Therefore, the hydrogen expelled from the vent 116 is dried without water vapor.

It should be noticed that the housing 110 in the apparatus 100 for generating hydrogen of the embodiment further includes a bulkhead 170 for dividing the housing 110 into two reservoirs 110b, and there are two pushing pieces 122a, two piercing elements 124, two first separating plates 130, two separating membranes 150, and two solid state reactants 140. Therefore, the liquid reactants 50 stored in the two first sub-rooms 110c could flow into the two second sub-rooms 110d through the two through holes 132 respectively and react with the two solid state reactants 140 to generate hydrogen respectively. Thus, the effect of sectionalized reaction could be achieved and the hydrogen generation rate could be controlled.

Figure 5:
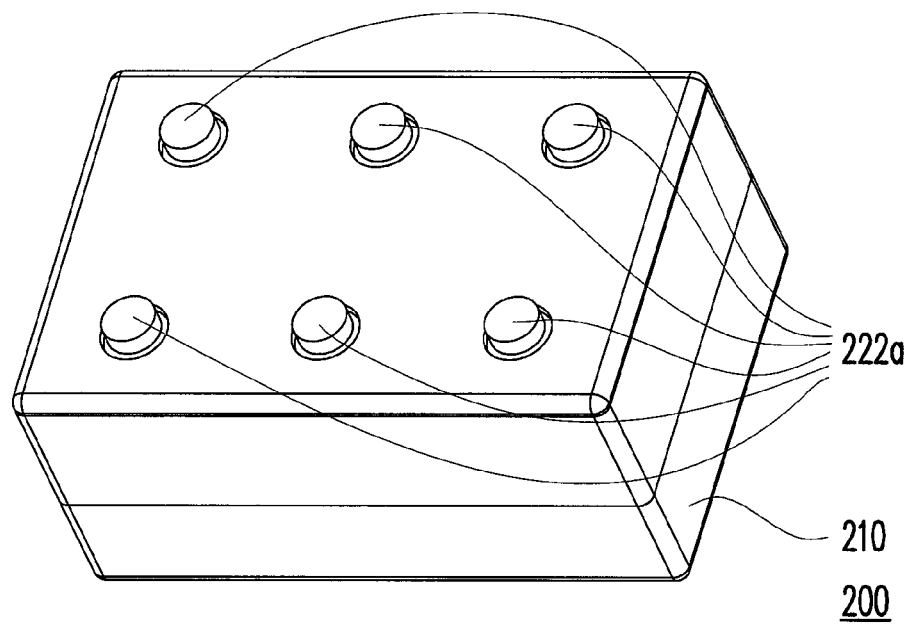
FIG. 5 is a three-dimensional diagram showing an apparatus for generating hydrogen according to another embodiment of the invention.
Figure 6:
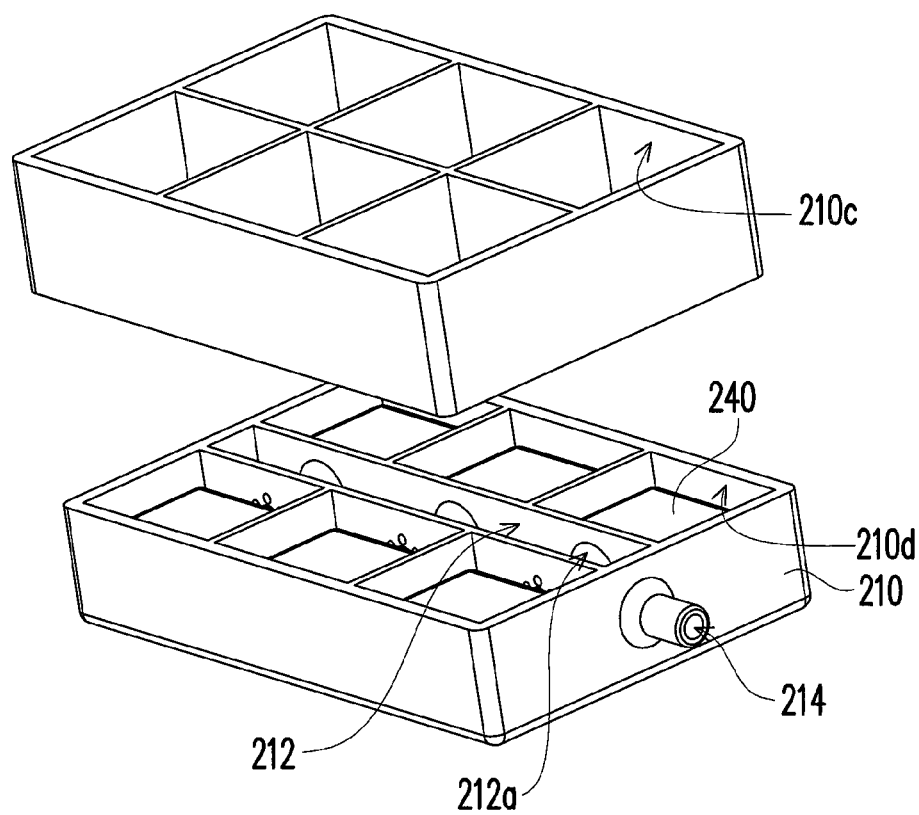
FIG. 6 is an exploded diagram shown a portion of components of the apparatus for generating hydrogen of FIG. 5.
Figure 7:
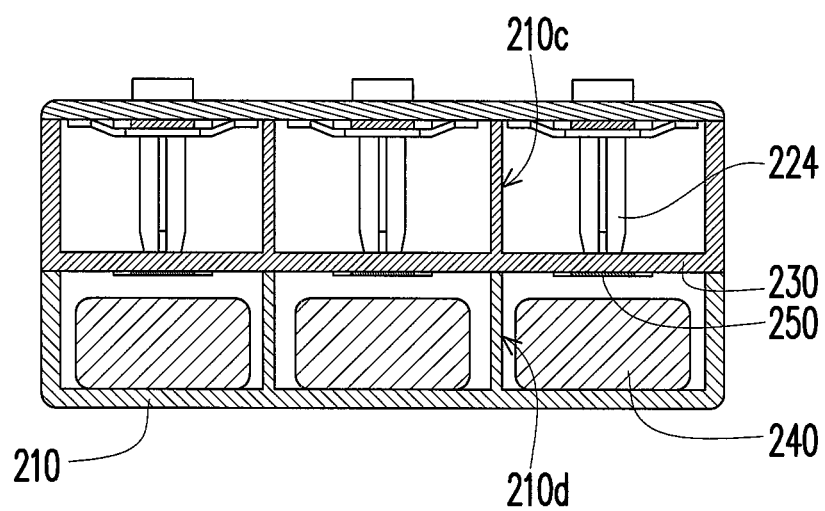
FIG. 7 is a cross-sectional view of the apparatus for generating hydrogen of FIG. 5.

FIG. 5 is a three-dimensional diagram showing an apparatus for generating hydrogen according to another embodiment of the invention. FIG. 6 is an exploded diagram shown a portion of components of the apparatus for generating hydrogen of FIG. 5. FIG. 7 is a cross-sectional view of the apparatus for generating hydrogen of FIG. 5. As shown in FIG. 5 to FIG. 7, comparing with the apparatus 100 for generating hydrogen shown in FIG. 1 to FIG. 4 in which there are two pushing pieces 122a, two piercing elements 124, two first separating plates 130, two separating membranes 150, and two solid state reactants 140, an apparatus 200 for generating hydrogen of the embodiment has six pushing pieces 222a, six piercing elements 224, six first separating plates 230, six separating membranes 250, and six solid state reactants 240 and the number of each of the first sub-rooms and the second sub-rooms is six. However, the invention is not limited to the number of each of the elements in the apparatus. In the other embodiments, the number of each of the elements in the apparatus could be varied with the practical requirements. Further, as shown in FIG. 6, to successfully conduct the hydrogen generated by the reaction between the solid state reactants 240 and the liquid reactants (not shown), the housing 210 of the embodiment further includes a conducting outlet 212 and a vent 214. The conducting outlet 212 has a plurality of through holes 212a each of which communicates with one of the second sub-rooms 210d respectively. In order to avoid the liquid reactant flowing out of the second sub-rooms 210d through the through holes 212a during the reaction, membranes having gas permeability and liquid impermeability further cover the through holes 212a. Hydrogen generated in each of the second sub-rooms 210d could be conducted to the vent 214 through the conducting outlet 212 and could be used by the fuel cell. By using several solid state reactants 240 separating from each other, the apparatus 200 for generating hydrogen could be repeated used rather than one-time use. Further, because of the batch reactions of the solid state reactants 240, the problem of power supply over the equipment requirement could be avoided.

Altogether, in at least one of the embodiments, the liquid reactant and the solid state reactant are respectively disposed in two different sub-rooms of the housing. When the button is pushed to damage the separating membrane for separating the sub-rooms from each other, the liquid reactant flows through the through hole and towards another sub-room where the solid state reactant is located due to gravity and the liquid reactant reacts with the solid state reactant. Since the liquid reactant is directly disposed in the sub-room and is not contained in any other object, the conventional situation that the liquid reactant remains in the water bag could be avoided. Thus, the proportion of liquid reactant reacting with the solid state reactant and the efficiency of hydrogen generation increases as well.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An apparatus for generating hydrogen for a fuel cell the apparatus comprising:
   a housing having an opening and a reservoir;
   a button connected to the housing and covering the opening;
   a first separating plate disposed in the housing for dividing the reservoir into a first sub-room and a second sub-room, wherein the opening communicates with the first sub-room, the first sub-room is suitable for storing a liquid reactant and the first separating plate has a through hole opposite to the button;

a solid state reactant disposed in the second sub-room; and a separating membrane disposed on the through hole for separating the first sub-room from the second sub-room, wherein, when the button is pushed, the button damages the separating membrane so that the liquid reactant flows to the second sub-room through the through hole due to gravity and the liquid reactant reacts with the solid state reactant to generate hydrogen.

2. The apparatus of claim 1, wherein the button is connected to the housing in a thermal compression process.

3. The apparatus of claim 1, wherein the first separating plate has a sloping surface and the through hole is disposed on a lower part of the sloping surface.

4. The apparatus of claim 1, wherein the button comprises:
a plate body connected to the housing and covering the opening;
a pushing piece connected to the plate body; and
a piercing element fixing on the pushing piece and facing the separating membrane.

5. The apparatus of claim 4, wherein the plate body is made of plastic material and the pushing piece is made of rubber.

6. The apparatus of claim 4, wherein the pushing piece is connected to the plate body in a double injection molding process.

7. The apparatus of claim 4, wherein the pushing piece is connected to the plate body in an adhering process.

8. The apparatus of claim 1, wherein the housing has a vent for communicating with the reservoir.

9. The apparatus of claim 8, wherein the housing has a conducting outlet for communicating the vent with the second sub-room.

10. The apparatus of claim 8, further comprising a second separating plate disposed in the housing for defining a flow path, wherein the flow path communicates the reservoir with the vent and a drying agent is disposed in the flow path.

11. The apparatus of claim 1, wherein the solid state reactant is sodium borohydride.

12. The apparatus of claim 1, wherein the housing comprises:
a bottom plate; and
a cover connected to the bottom plate so that the cover and the bottom plate together define the reservoir, wherein the opening is formed in the cover and the first separating plate is connected to an inner wall of the cover.

* * * * *